United States Patent Office 3,833,552
Patented Sept. 3, 1974

3,833,552
WATER-SOLUBLE WHIPPABLE PROTEIN MATERIAL AND PROCESS FOR PRODUCING SAME
Cavit Akin, Oakbrook, Ill., assignor to Standard Oil Company, Chicago, Ill.
No Drawing. Filed Feb. 4, 1971, Ser. No. 112,800
Int. Cl. A23j 1/00, 1/18
U.S. Cl. 260—112 R          11 Claims

ABSTRACT OF THE DISCLOSURE

A water-soluble protein material, suitable for use in whipped food products, is derived from single-cell protein (SCP) material by treatment with aqueous acid under controlled temperature and time conditions.

BACKGROUND OF THE INVENTION

Recent concern for the welfare of the world population has included consideration of additional means for feeding the rapidly increasing number of people involved. The problem embraces providing both adequate per capita caloric intake and a balanced diet, with particular reference to the acknowledged lack of sufficient protein-affording foods in many parts of the world. One means for providing necessary protein supplies is through the growth of single-cell protein-affording microorganisms, such as yeasts, bacteria and algae, for use as either foods or food supplements.

Production of single-cell protein (SCP) materials in large quantity may be accomplished by fermentation processes employing, for example, carbohydrate, hydrocarbon or oxygenated hydrocarbon materials as substrate. Principal requirements are that the substrate material be inexpensive and readily consumed by the selected microorganism so that process costs are not excessive. Equally important is the acceptability and utility of the SCP material as a food or food component. These latter considerations include taste and odor factors relating to public acceptance as well as metabolic and toxicity factors relating to suitability of SCP material for inclusion in the human diet.

Both the technical and the patent literature describe fermentation processes for production of microorganisms which readily afford useful SCP materials. For example, yeasts have been grown on the carbohydrates contained in waste sulfite liquor, the normal alkane components of a gas oil hydrocarbon fuel, and on a mixture of oxygenated hydrocarbons. Production of bacteria has been similarly described. Fermentation to produce yeasts or bacteria comprises an oxidation process, evolving much heat and requiring both substantial oxygen transfer and good control of fermentation temperature. Preferred substrate materials will already contain as much combined oxygen as possible in order to minimize the heat release and the oxygen requirement. Production of food-grade SCP material may also require an extraction step to limit the presence of undesirable, residual substrate material such as high-molecular-weight hydrocarbons or slowly fermented oxygenated hydrocarbon species.

A number of the fermentation processes planned or in use currently for production of SCP material are intended to provide primarily an animal feed supplement and hence to supply protein for human consumption only indirectly. However, some microorganisms, notably certain yeasts within the *Saccharomycetoideae* and *Cryptococcoideae* sub-families, have been approved by the Food and Drug Administration for direct use in foods intended for human consumption.

SCP materials may be utilized as whole cells or may be processed to recover protein or protein hydrolysates for inclusion in various food products. The whole-cell material typically is deficient in desirable functional properties, being powdery small cells (1–10 micron dimensions) which do not form a cohesive structured mass. The protein content of cells may largely be recovered by rupture or destruction of the cell wall, as by application of shearing forces or autolytic treatment with enzymes. Such proteins are usually concentrated by adjusting the pH to the isoelectric point and separating as by filtration or centrifugation. The hydrolysates comprise chemically degraded protein material rich in the amino acid moieties which normally combine together to form the protein macromolecules.

Desirable functional properties in SCP materials include low-dispersibility in water, good water retention, oil absorption and retention, heat coagulation and emulsion stabilization. Water-soluble protein materials, intended for replacement or supplementation of egg albumin, should exhibit good whippability providing a large and stable foamed mass.

SUMMARY OF THE INVENTION

It is the object of this invention to provide a water-soluble protein material, derived from single-cell protein, suitable for use in whipped food products.

I have found that treatment of unicellular microorganisms, particularly bacteria and yeasts, with aqueous acid solution at a controlled elevated temperature for a limited time provides a highly whippable protein material. My protein product is soluble in water over the pH range from 1 to 7 and can be precipitated by addition of an alkanol in sufficient quantity.

Specifically, I prefer to prepare a slurry of microbial cells in aqueous mineral acid, heat the slurry to 60°–100° C. for 10–30 minutes, remove the residual cell material and precipitate the desired protein fraction by addition of a water-soluble alkanol. The recovered protein concentrate exhibits better whippability than egg albumin.

DESCRIPTION OF THE INVENTION

This invention discloses a novel method for providing an improved water-soluble protein fraction exhibiting excellent whippability properties in preparing food products for human consumption.

It has been found that suitable protein material can be obtained from single-cell protein sources by treatment of microbial cells with aqueous acid. Although the cell wall remains intact most of the protein content of the cell is extracted into the aqueous acid phase. The suitable temperature range extends from about 60° to about 100° C. when maintained for a time ranging from 10 to 30 minutes. The protein fraction is not precipitated by adjustment of the pH to the isoelectric point but does precipitate upon the addition of a water-soluble lower alkanol. The recovered protein concentrate exhibits excellent whippability.

The practice of this invention is broadly applicable to microorganisms and particularly to those organisms classified as bacteria, yeast and fungi. By way of illustration bacteria such as those listed in Table I, yeasts such as those listed in Table II and fungi such as those listed in Table III are suitable microorganisms.

TABLE I

Suitable bacteria:
    *Acetobacter sp.*
    *Arthrobacter sp.*
    *Bacillus subtilus*
    *Corynebacteria sp.*
    *Micrococcus sp.*
    *Pseudomonas sp.*

TABLE II

Suitable yeasts:
- Candida curvata
- Candida lipolytica
- Candida pulcherima
- Candida utilis
- Hansenula anomala
- Hansenula miso
- Oidium lactis
- Saccharomyces carlsbergensis
- Saccharomyces fragilis
- Trichosporon cutaneum
- Saccharomyces cerevisiae
- Candida parapsilosis
- Hansenula wickerhamii
- Pichia pastoris
- Pichia haplophyla

TABLE III

Suitable fungi:
- Aspergillus niger
- Aspergillus glaucus
- Aspergillus oryzae
- Aspergillus terreus
- Aspergillus itaconicus
- Penicillium notatum
- Penicillium chrysogenum
- Penicillium glaucum
- Penicillium griseofulvum

*Candida utilis, Saccharomyces cerevisiae, Saccharomyces fragilis,* and *Saccharomyces carlsbergensis* are preferred starting materials for the process of this invention, however, because each has been generally regarded as safe by the F.D.A. for use in food products.

This invention may be applied to either isolated cellular material or to cells newly grown in a fermentation process. Where the cellular material has been previously isolated it should be slurried with water to provide the desired cell concentration. Where fresh cells are employed the fermentor effluent may be concentrated, as by centrifugation, to provide a suitable slurry.

The concentration of cellular SCP material suspended in the aqueous acid solution may vary within the range from 1 to 20 wt. percent (dry basis) and is preferably held within the range from 3 to 10 wt. percent (dry basis) cells.

The acid to be employed in the process of this invention may be a mineral acid selected from hydrochloric, phosphoric and sulfuric acids although hydrochloric acid is preferred. Certain organic acids, such as lactic and acetic, may also be employed. The molarity of the acid in the aqueous solution may vary from about 0.25 molar to about 5.0 molar. Treatment is preferably conducted with approximately 0.5–1.0 molar acid solutions and especially suitable protein fractions are obtained by treatment at about 0.5 molarity of mineral acid.

Suitable temperatures for the practice of this invention range from about 60° C. up to the boiling point of the aqueous acidic medium, or about 100° C. Especially preferred are temperatures within the range from 80° to about 100° C.

Treating time may vary from about 10 to about 30 minutes. When operating the process at about 60° C. the treating time is preferably about 30 minutes although this period decreases to 10–20 minutes at treating temperatures of about 100° C.

The slurry may be cooled and then separated into two phases, one being a solid residue comprising insoluble cellular materials and the other a supernatant aqueous phase containing water-soluble protein material. The separation may be effected by any conventional means, such as filtration or centrifugation. In a preferred operation the hot slurry is fed directly to a centrifuge and the effluent supernatant phase is cooled to the desired temperature.

The protein material is soluble in the aqueous acid solution over the entire pH range from about 1 up to the neutral point at pH 7.0. The desired protein fraction may be concentrated by precipitation upon addition of a water-soluble alkanol to the acidic solution. Precipitation is effected by addition of about 0.5 to about 2 volumes of alkanol per volume of acidic supernatant phase. Use of an equal volume of alkanol is usually preferred.

Although any lower alkanol completely miscible with the aqueous acid may be employed, ethanol is preferred because its use presents no toxicity problems requiring its complete removal from the treated material.

The precipitated protein material may then be recovered by conventional means although centrifugation is preferred. The recovered product may then be dried with care being taken to avoid exposure to extremely high temperatures. It is preferred, for example, to dry the protein concentrate at a temperature of about 70° C. If desired, vacuum or spray drying may be employed. The dried product remains soluble in water.

The protein concentrate provided by this invention is surprisingly effective in preparing whipped food products. The product of this invention is more effective than egg albumin in its whipping properties, providing a large volume of foam which does not break down readily. Its water solubility affords a general compatibility with food materials. No toxicity problem is presented, because of proper selection of the source material, so that a novel food ingredient for use in foods intended for human consumption is afforded. Accordingly, the SCP food materials of this invention possess great versatility relative to incorporation in conventional food products and to development of new food products.

SPECIFIC EMBODIMENTS OF THE INVENTION

The following examples are illustrative, without implied limitation, of my invention.

EXAMPLE I

Spray-dried Torula yeast (*Candida utilis*) was treated with aqueous acids over a broad range of molarities as shown in Table IV. In all experiments the Torula yeast was treated as a 5 wt. percent suspension in the selected aqueous acidic medium for 30 minutes at 100° C. The treated cells were then washed twice with sufficient distilled water to provide a 5 wt. percent suspension in order to remove substantially all mineral acid anions. The cells were then dried and analyzed for protein content. There was consistently an extreme diminution in the protein content of the treated cells such that the nutritive value of the treated cells became unattractive, the major portion of the protein material being taken into the aqueous acidic solution.

TABLE IV.—ACID TREATMENT OF TORULA CELLS

| Acid | Concentration | Protein analysis, wt. percent |
|---|---|---|
| None | | 56.0 |
| Distilled water | | 33.3 |
| $H_2SO_4$ | 1M | 30.0 |
| | 0.5M | 51.0 |
| $H_3PO_4$ | 2M | 35.6 |
| | 1M | 28.2 |
| | 0.33M | 30.0 |
| HCl | 2M | 19.2 |
| | 0.5M | 25.2 |
| Lactic | 5M | 24.4 |
| Acetic | 5M | 23.4 |

Example II

Fresh cells of the yeast *Candida utilis* (500 ml. aqueous slurry containing 6 wt. percent cells on dry basis) were mixed with 500 ml. 1M HCl solution in water. The mixture was boiled for 20 minutes and separated by centrifugation. The recovered supernatant phase contained 0.6 wt. percent soluble protein in 1000 ml. of 0.5 M HCl. The protein was precipitated by addition of one volume of ethanol (95 vol. percent to the supernatant phase and recovered by centrifuging. The recovered protein was still soluble in water.

Example III

A 1% solution (1 g. in 100 ml. water) of the protein product of Example II was buffered to pH 7 and whipped in a Sunbeam #1406 Mixmaster at speed setting "9." At two-minute intervals the overrun was determined as shown in Table V.

Overrun is a measure of the percentage increase in volume of a slurry or solution on whipping. For a given volume of material:

$$\text{Percent overrun} = 100 \times \frac{\text{wt. before whipping} - \text{wt. after whipping}}{\text{wt. after whipping}}$$

The procedure was duplicated employing egg albumin as also shown in Table V. Comparison of the overrun data illustrate the stability of the foam obtained when employing the water-soluble protein fraction and the loss of foaming power with time in the case of the egg albumin.

With the extracted protein material, the entire volume of water was held in the foam. The color of the whipped product was white.

TABLE V.—WHIPPABILITY TEST WITH ACID EXTRACTED PROTEIN

| | Percent overrun | |
|---|---|---|
| | Extracted protein | Egg albumin |
| Whipping time, min.: | | |
| 2 | 825 | 965 |
| 4 | 655 | 666 |
| 6 | 655 | 517 |
| 8 | 655 | 541 |
| 10 | 720 | 483 |
| Beat | 825 | |

I claim:
1. A process for the isolation of a whippable protein fraction from microbial cells, comprising the steps of:
   (a) slurrying the cells with an aqueous acid solution having a molarity within the range from 0.25 to 5.0, to provide a slurry containing from 1 to 20 wt. percent (dry basis) microbial cells;
   (b) heating the slurry to a temperature within the range from about 60° to about 100° C.;
   (c) maintaining the slurry within the selected temperature range for from about 10 to 30 minutes;
   (d) separating the heated slurry into a solid phase comprising residual cell material and an aqueous supernatant phase comprising a water-soluble protein fraction;
   (e) precipitating the protein fraction from the aqueous phase by addition of 0.5 to 2.0 volume of a water-soluble alkanol; and
   (f) recovering the precipitated protein fraction.

2. The process of claim 1 wherein the acid is a mineral acid selected from the class consisting of hydrochloric acid, phosphoric acid and sulfuric acid.
3. The process of claim 1 wherein the molarity of the acid solution is within the range from 0.5 to 1.0.
4. The process of claim 1 wherein the slurry contains from 3 to 10 wt. percent (dry basis) microbial cell material.
5. The process of claim 1 wherein the slurry is maintained at a temperature within the range from about 80° to about 100° C. for about 20 minutes.
6. The process of claim 1 wherein the water-soluble alkanol is ethanol.
7. The process of claim 1 wherein the microbial cells are selected from the class consisting of bacteria and yeasts.
8. The process of claim 7 wherein the yeast is *Saccharomyces carlsbergensis*, *Saccharomyces cerevisiae*, *saccharomyces fragilis* or *Candida utilis*.
9. The process of claim 8 wherein the yeast is *Candida utilis*.
10. A process for the preparation of a whippable water-soluble protein concentrate from the single-cell protein material contained within the cells of the yeast *Candida utilis*, comprising the steps of:
    (a) slurrying together said cells and aqueous hydrochloric acid, having a molarity of about 0.5, to provide a cell concentration within the range from 3 to 10 wt. percent (dry basis);
    (b) heating the slurry to about 100° C. and maintaining the slurry at that temperature for about 20 minutes;
    (c) centrifuging the heated slurry to provide a supernatant aqueous phase comprising water-soluble protein material;
    (d) concentrating the protein material by the addition of an equal volume of ethanol to the aqueous phase to precipitate the water-soluble protein material; and
    (e) recovering the precipitated water-soluble protein material.
11. The whippable protein material prepared by the process of claim 1.

References Cited
UNITED STATES PATENTS

| 3,099,562 | 7/1963 | Rogers | 99—14 X |
| 3,268,412 | 8/1966 | Champagnat et al. | 99—14 X |
| 3,686,144 | 8/1972 | Tamura et al. | 260—112 R |
| 3,585,179 | 6/1971 | Samejiona et al. | 99—14 X |
| 3,615,654 | 10/1971 | Ayukawa | 99—14 X |
| 3,634,194 | 1/1972 | Frankenfeld | 195—1 |

RAYMOND N. JONES, Primary Examiner

U.S. Cl. X.R.

426—163, 204, 364